United States Patent [19]

Marino

[11] Patent Number: 5,768,034
[45] Date of Patent: Jun. 16, 1998

[54] LENS TILT ERROR REDUCTION ACTUATOR

[75] Inventor: Philip Frank Marino, Rochester, N.Y.

[73] Assignee: Eastman Kodak Company, Rochester, N.Y.

[21] Appl. No.: 686,162

[22] Filed: Jul. 24, 1996

Related U.S. Application Data

[60] Provisional application No. 60/007,059 Oct. 25, 1995.

[51] Int. Cl.$^6$ .................................................. G02B 7/02
[52] U.S. Cl. .................. 359/814; 359/823; 369/44.14; 369/44.15
[58] Field of Search ............................ 359/811, 813, 359/814, 823; 369/44.15, 44.16, 44.14

[56] References Cited

U.S. PATENT DOCUMENTS

| | | | |
|---|---|---|---|
| 4,991,161 | 2/1991 | Ikegame et al. | 369/44.15 |
| 5,208,703 | 5/1993 | Ikegame et al. | 359/813 |
| 5,414,680 | 5/1995 | Ikegame | 369/44.14 |

*Primary Examiner*—Loha Ben
*Attorney, Agent, or Firm*—Raymond L. Owens

[57] ABSTRACT

An optical actuator is disclosed for positioning a lens to focus a laser light beam on a surface of a member, such as on optical disk, with minimum lens tilt error. The optical actuator includes a lens mount for supporting the lens, and at least one upper flexure and one lower flexure that are each fixed to the lens mount at a point. The flexures are arranged so that they when viewed from one side a line defined by each flexure would extend from the fixed point of each flexure and intersect at a point spaced at a distance from each flexure, forming an angle θ therebetween. The optical actuator further includes a structure for applying a force to the lens mount along a line to cause the upper flexure and lower flexure to deflect such that the lens moves to focus the light beam. The intersection point of the upper flexure and lower flexure is selected such that the lens tilt error caused by tension and compression of the upper flexure and lower flexure is compensated by a tilt caused by angle θ, to thereby substantially minimize lens tilt error during focusing of the light beam.

6 Claims, 2 Drawing Sheets

LENS TILT ERROR REDUCTION ACTUATOR

CROSS-REFERENCE TO RELATED APPLICATIONS

Reference is made to and priority claimed from U.S. Provisional application Ser. No. 60/007,059, filed Oct. 25, 1995, entitled LENS TILT ERROR REDUCTION ACTUATOR.

Reference is made to commonly assigned U.S. application Ser. No. 08/686,161 entitled "Actuator with Reduced Lens Tilt Error" by Phil Marino, filed Jul. 24,1996.

FIELD OF THE INVENTION

This invention relates to optical actuators, and more particularly to focusing a laser beam on a surface, such as an optical disk, so that lens tilt error is minimized.

BACKGROUND OF THE INVENTION

An optical disk recording and reading device includes a lens which focuses a laser light beam onto an optical disk while the disk is rotating. Focus and/or tracking actuators are used in optical disk recording and reading devices to control the position of the lens relative to the rotating disk. The actuators are necessary because of unavoidable warp of the disks, spindle errors, and other mechanical and optical imperfections.

Both focus and tracking of optical disks must continuously be maintained while the disks are recording and/or reading. Focus is controlled by adjusting the distance between the lens and the disk surface. Tracking is controlled by maintaining the lens at the correct radial position such that a single data track is read or written at a time. The motions of the actuator are controlled by a servo system.

Alignment of the optical axis of the lens to the disk (i.e., lens tilt) must be maintained accurately for the system to function properly. Errors in lens alignment are caused by various manufacturing and assembly errors, such as lens installation in the actuator, installation and alignment of the actuator in the writer, and actuator motion errors. The motion errors are caused by tilting of the actuator as it is moved to maintain focus and tracking relative to the rotating disk. The lens tilt caused by actuator motion is typically minimized by careful actuator design and tight tolerances on actuator parts and assembly processes, which are difficult, time consuming, labor intensive and expensive.

The problem with the presently known and utilized optical actuator is the existence of an inherent lens tilt error during focus motion. The inherent lens tilt error, which is independent of manufacturing and assembly errors, causes the overall system to operate improperly. Consequently, available laser power is not used effectively, and the spot size, shape and quality of the laser light beam cannot be controlled properly. Manufacturing and assembly costs are also increased.

SUMMARY OF THE INVENTION

It is an object of this invention to provide optical actuators with minimized lens tilt error.

It is another object of this invention to provide improved system performance by obtaining better controlled spot size, shape, and quality of the laser light beam.

Yet another object of this invention is to provide more effective use of available laser power.

A further object of this invention is to decrease manufacturing and assembly costs by assigning a larger portion of the allowable lens tilt to manufacturing and assembly errors. These objects are achieved by an optical actuator for positioning a lens to focus a laser light beam on a surface of a member, such as an optical disk, with minimum lens tilt error, comprising:

a) a lens mount for supporting the lens;

b) at least one upper flexure and one lower flexure, each fixed to the lens mount at a point, the upper flexure and lower flexure being arranged so that when viewed from one side a line defined by each flexure would extend from the fixed point of each flexure and intersect at a point spaced at a distance from each flexure, forming an angle $\theta$ therebetween;

c) means for applying a force to the lens mount along a line to cause the upper flexure and lower flexure to deflect such that the lens moves to focus the light beam; and d) the intersection point of the upper flexure and lower flexure being selected such that the lens tilt error caused by tension and compression of the upper flexure and lower flexure is compensated by a tilt caused by angle $\theta$, to thereby substantially minimize lens tilt error during focusing of the light beam.

ADVANTAGES

An optical actuator according to this invention provides an optical actuator with minimized lens tilt error by substantially reducing the change in flexure length during focus motion.

An optical actuator according to this invention provides improved system performance by providing more effective use of the available laser power, and better controlled spot size, shape and quality of the laser light beam.

An optical actuator according to this invention provides for a larger portion of the allowable lens tilt to be assigned to manufacturing and assembly errors. This results in lower cost and/or less critical and less costly manufacturing and assembly processes.

DETAILED DESCRIPTION OF THE INVENTION

Figure 1:
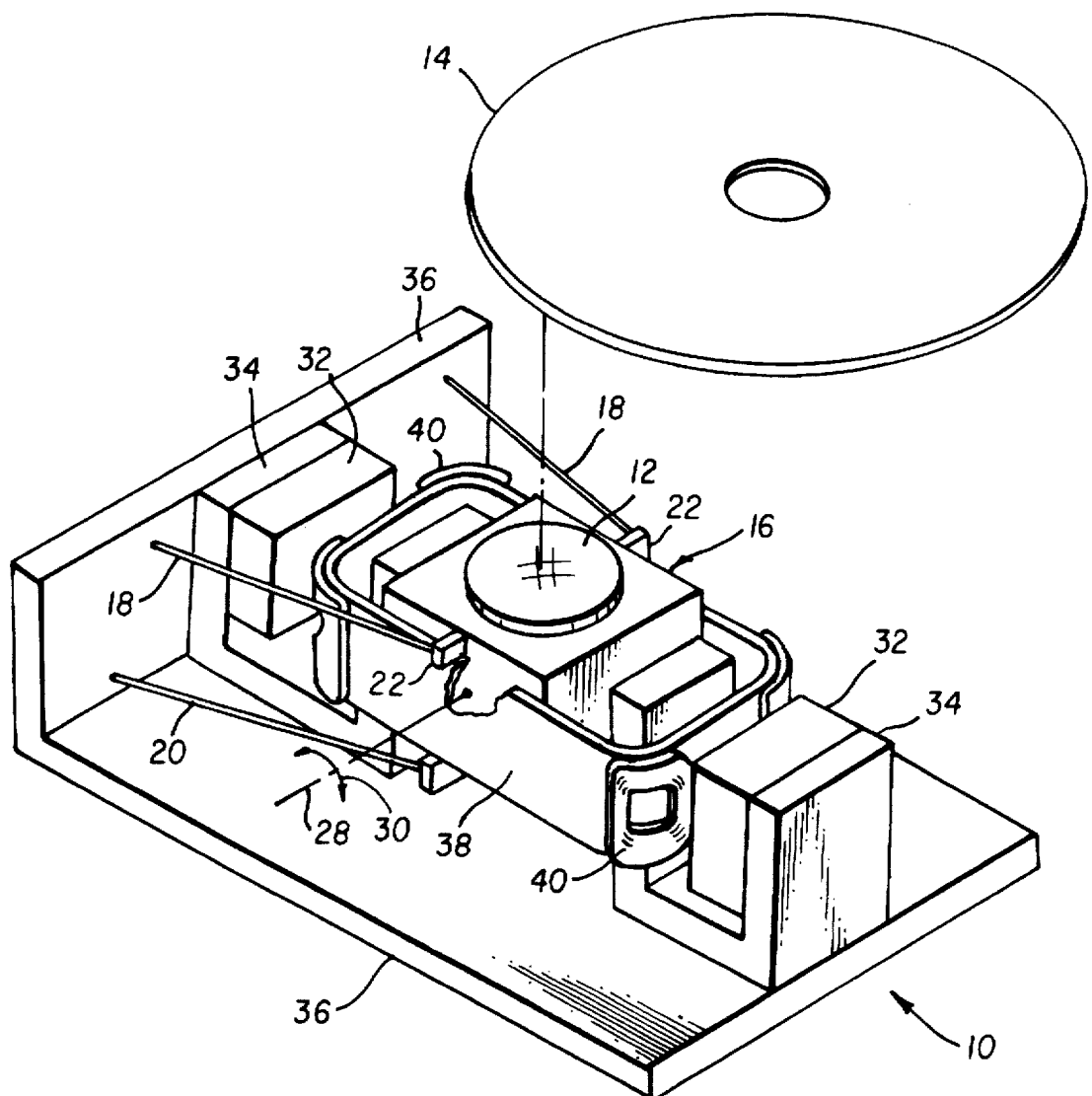
FIG. 1 is a perspective view of the optical actuator, showing a structure for applying a force to the actuator in accordance with the present invention to minimize lens tilt error.

Referring to FIG. 1, a perspective view of an optical actuator 10 in accordance with this invention is shown. The optical actuator 10 includes a lens 12 which is well known in the art to focus a laser light beam on a surface of a disk member 14. Preferably, the disk member 14 is an optical reading and/or recording disk. The lens 12 is fixed to a lens mount 16 by an adhesive or other fastening structure not shown. The optical actuator 10 further includes at least one upper flexure 18 and one lower flexure 20 which are each fixed to the lens mount 16 at a point 22. The upper flexure 18 and lower flexure 20 are arranged so that when viewed from one side a line defined by each flexure would extend from the fixed point 22 of the upper flexure 18 and the lower flexure 20 and intersect at a point 24 spaced a distance from the upper flexure 18 and lower flexure 20, forming an angle θ therebetween. Preferably, the optical actuator 10 includes two upper flexures 18 and two lower flexures 20. These flexures can be metal wires, however, they can also be molded plastic. Preferably, the lens mount 16 is made of a molded plastic, such as VECTRA (General Electric Company).

Figure 2:
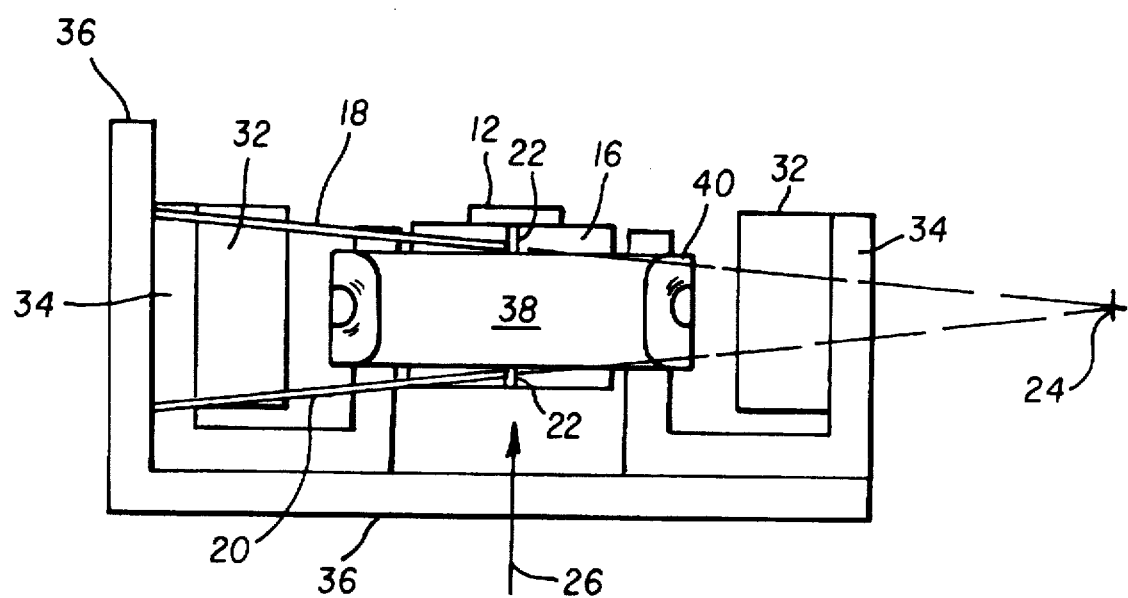
FIG. 2 is a side view of the optical actuator of FIG. 1, showing upper flexure and lower flexure fixed to a lens mount in accordance with the present invention.

Referring to FIG. 2, a side view of the optical actuator in accordance with this invention is shown. To focus the laser light beam on the surface of the optical disk 14, a force is applied to the lens mount 16 along a line 26 perpendicular to the surface of the optical disk 14. The force causes the upper flexure 18 and the lower flexure 20 to deflect so that the lens mount 16 supporting the lens 12 moves in a direction along the force-applied line 26 in order to focus the laser light beam on the surface of the optical disk 14.

The focus force typically causes tension and compression of the upper flexure 18 and the lower flexure 20. The tension and compression of the upper flexure 18 and the lower flexure 20 result in a lens tilt, i.e., rotation of the lens 12 about a line 28 through the lens 12 and parallel to the surface of the optical disk 14. The direction of the lens tilt is known as the lens pitch 30. This is shown in FIG. 1.

When the focus force is applied to the lens mount 16 to focus the laser light beam on the surface of the disk member 14 in accordance with the present invention, a balancing tilt is caused by the angle θ of the upper flexure 18 and the lower flexure 20. The geometry of the angled flexures causes the lens mount 16 to rotate about the intersection point 24, rather than move in a direction perpendicular to the surface of the disk member 14. By varying the vertical flexure spacing, and the angle θ of the upper flexure 18 and the lower flexure 20, the location of the intersection point 24 changes. By changing the location of the intersection point 24, the magnitude of the rotation of the lens mount 16 varies. Preferably, the angle θ is selected such that the balancing tilt caused by the angle θ is equal and opposite to the lens tilt caused by the flexure tension lengthening and flexure compression shortening of the upper flexure 18 and the lower flexure 20 during focusing of the light beam on the surface of the disk member 14. The balancing tilt compensates for the lens tilt error, thereby substantially reducing the lens tilt error.

Referring again to FIG. 2, a conventional motor arrangement is shown which can be used to apply focus force to the lens mount 16. The motor arrangement includes a pair of magnets 32, which are fixed to a pair of magnetic yokes 34. The magnetic yokes 34 are secured to opposite sides of a base 36. The motor arrangement further includes a focus motor coil 38 and four tracking motor coils 40. The focus motor coil 38 is wrapped around the magnetic yokes 34 and the lens mount 16. Each tracking motor coil 40 is secured to a corner of the focus motor coil 38.

In operation, current is applied to the focus motor coil 38 to create a magnetic field. By energizing the focus motor coil 38, the upper flexure 18 and the lower flexure 20 are put under tension and compression, causing the lens mount 16 to move in a direction along the force-applied line 26, which is perpendicular to the surface of the disk member 14. By energizing the tracking motor coils 40, the lens mount 16 moves in a direction parallel to the plane of the disk member 14 for tracking of the disk member 14 during recording or reading.

The invention has been described in detail with particular reference to a preferred embodiment thereof. However, it will be understood that variations and modifications can be effected within the spirit and scope of the invention.

Parts List 10 optical actuator
12 lens
14 disk member
16 lens mount
18 upper flexure
20 lower flexure
22 flexure point
24 intersection point
26 force-applied line
28 line
30 lens pitch
32 magnet
34 magnetic yoke
36 base
38 focus motor coil
40 tracking motor coil

What is claimed is:

1. An optical actuator for positioning a lens to focus a laser light beam on a surface of a member, such as an optical disk, with minimum lens tilt error, comprising:

a) a base;

b) a lens mount for supporting the lens;

c) at least one upper flexure and one lower flexure, each fixed at one end to the base, and at the other end to the lens mount,the upper flexure and lower flexure being arranged so that when viewed from one side a line defined by each flexure would extend from the fixed end of each flexure on the lens mount and intersect at a point spaced at a distance from each flexure, forming an angle θ therebetween;

d) means for applying a force to the lens mount along a line to cause the upper flexure and lower flexure to deflect such that the lens moves to focus the light beam; and e) the intersection point of the upper flexure and lower flexure being selected such that the lens tilt error caused by tension and compression of the upper flexure and lower flexure is compensated by a tilt caused by angle θ, to thereby substantially minimize lens tilt error during focusing of the light beam.

2. The optical actuator according to claim 1 wherein the force-applied line when viewed from the side is positioned through the center of the lens.

3. The optical actuator according to claim 1 wherein the flexures are wires.

4. The optical actuator according to claim 3 wherein the flexures further include two upper wires and two lower wires.

5. The optical actuator according to claim 1 wherein the flexures are molded plastic.

6. The optical actuator according to claim 5 wherein the flexures are further include two upper molded plastic flexures and two lower molded plastic flexures.

* * * * *